(12) United States Patent
Johnson (10) Patent No.: US 6,649,120 B1
(45) Date of Patent: Nov. 18, 2003

(54) BLOW MOLDING APPARATUS AND METHOD

(75) Inventor: David M. Johnson, Saline, MI (US)

(73) Assignee: R&B Machine Tool Company, Saline, MI (US)

( * ) Notice: Subject to any disclaimer, the term of this patent is extended or adjusted under 35 U.S.C. 154(b) by 0 days.

(21) Appl. No.: 10/089,413

(22) PCT Filed: Sep. 29, 2000

(86) PCT No.: PCT/US00/26947
§ 371 (c)(1),
(2), (4) Date: Mar. 28, 2002

(87) PCT Pub. No.: WO01/23164
PCT Pub. Date: Apr. 5, 2001

Related U.S. Application Data
(60) Provisional application No. 60/156,640, filed on Sep. 29, 1999.

(51) Int. Cl.[7] .......................... B29C 49/04; B29C 49/24; B29C 49/30
(52) U.S. Cl. .................. 264/509; 264/542; 425/503; 425/532; 425/537; 425/538
(58) Field of Search ................................. 264/540, 542, 264/509; 425/532, 538, 503, 504, 537

(56) References Cited

U.S. PATENT DOCUMENTS

| | | |
|---|---|---|
| 1,813,721 A | 7/1931 | Wright |
| 1,935,794 A | 11/1933 | Geyer |
| 2,334,640 A | 11/1943 | Miller |
| 3,197,811 A | 8/1965 | Workman |
| 3,933,968 A | 1/1976 | Sorbier |
| 3,998,576 A | 12/1976 | Frohn et al. |
| 4,961,888 A | 10/1990 | Brown |
| 5,032,072 A | 7/1991 | Heuschkel |
| 5,075,051 A | 12/1991 | Ito et al. |
| 5,209,889 A | 5/1993 | Brown et al. |
| 5,358,398 A | 10/1994 | Brown et al. |
| 5,576,034 A | 11/1996 | Kiefer et al. |
| 6,019,929 A | 2/2000 | Noggle et al. |

Primary Examiner—Robert Davis
(74) Attorney, Agent, or Firm—Reising, Ethington, Barnes, Kisselle, P.C.

(57) ABSTRACT

A blow molding apparatus (10) including four molds (21, 22, 23, 24) that move into a common parison receiving position (26) from directions different from the directions that the molds move out of the parison receiving position (26). When in the parison receiving position (26), each mold receives, encloses and severs a length of parison then shapes the parison during blow molding. Two molds (21, 22) alternately move in respective first and second radial directions (36, 40) from the parison receiving position (26) to respective first and second outer positions (38, 39), to a common article take-out position (45) and then back to the parison receiving position (26) from a third radial direction (96). The third radial direction is angularly spaced between the first and second radial directions. Two additional blow molds (23, 24) alternately move from the parison receiving position (26) in the respective first and second radial directions (36, 40) to the respective outer positions (38, 39), to a common article take-out position (46) and then back to the parison receiving position (26) from a fourth radial direction (98). The fourth radial direction is angularly spaced between the first and second radial directions and is generally opposite the third radial direction (96).

18 Claims, 9 Drawing Sheets

BLOW MOLDING APPARATUS AND METHOD

TECHNICAL FIELD

This invention relates generally to a blow molding apparatus for blow molding hollow articles such as plastic bottles.

BACKGROUND OF THE INVENTION

Blow molding machines for blow molding hollow articles such as plastic bottles are known to include parison extruders configured to continuously extrude tubular parisons vertically downward through a parison extruder head. It is also known for a blow molding apparatus of this type to include two blow molds supported on trolleys. A drive system alternately moves the trolleys to transport each blow mold into a position aligned with the parison extruder head in a parison receiving position to receive parison from the parison extruder.

Each blow mold includes a blow mold cavity shaped to complement a desired exterior shape of a hollow article to be formed in the mold. Each blow mold and blow mold cavity is split into two parts that are movable away from one another to an open position that allow the mold to receive a length of parison from the parison extruder. The mold parts are movable back toward each other to a closed or clamped position around such a length of parison.

It is also known for mold parts to be moved apart by the drive system in advance of moving the mold into the parison receiving position. This allows an article take-out mechanism to extract a blown article from each mold after hardening and allows an in-mold labeler to place a label on an inner wall of the mold cavity.

A blow pin may be supported on each trolley adjacent an associated blow mold carried on each trolley. Each blow pin is movable into a position aligned with an upper opening in its associated mold cavity. Each blow pin is also supported for insertion into its associated mold cavity through the upper opening of that mold cavity. Each blow pin is configured to inject gas into a length of parison supported within its associated mold cavity to expand the parison against inner walls of the mold cavity to form a hollow article to a desired shape as is well known in the art.

Some blow molding machines of this type also include two ramped surfaces disposed adjacent and beneath the parison extruder head. The trolleys are each movably supported on one of the ramped surfaces such that the trolleys are elevated at upper end of their respective ramped surface when their respective molds are disposed in the parison receiving position. The ramps cause the blow molds to descend as they move laterally away from the extrusion head after severing or "capturing" a length of parison for blow molding. The downward component of this motion prevents the continuously advancing parison still flowing from the extrusion head from being pulled sideways and distorted due to contact with and sticking to an upper surface of the mold as the trolley moves the mold away from the parison receiving position.

What is needed is a blow molding apparatus for blow molding hollow articles such as plastic bottles that can dedicate a higher percentage of total cycle time to cooling the parison without reducing the number of blown articles produced by the apparatus over a given period of time.

INVENTION SUMMARY

A blow molding apparatus for blow molding hollow articles such as plastic bottles is provided that includes a parison extruder configured to extrude a tubular parison along an extrusion axis. First and second blow molds are supported for movement into a parison receiving position aligned with the extrusion axis and for movement out of the parison receiving position in respective first and second radial directions. Each blow mold is configured to receive a length of parison extending from the parison extruder when in the parison receiving position, to enclose and sever the length of parison, to contain and shape the parison during blow molding and to release the blown article in an article take-out position. The apparatus includes a drive configured to alternately move the first and second blow molds into the parison receiving position, from the parison receiving position in the respective first and second radial directions and back to the parison receiving position.

Unlike the prior art, at least one of the first and second blow molds is supported for movement into the parison receiving position from a third radial direction angularly spaced between the first and second radial directions.

Cycling the molds back into the parison receiving position from directions different from those used to move the molds out of the parison receiving position allows the two blow molds to be cycled through a common workstation such as an article take-out station and/or an in-mold labeling station.

The invention also includes a method for blow molding hollow articles such as plastic bottles. According to this method one can blow mold hollow articles such as plastic bottles by first providing a blow molding apparatus including a parison extruder and first and second blow molds, each blow mold being configured to contain and shape lengths of parison during blow molding and to release resulting blown articles in an article take-out position and a drive configured to alternately move the first and second blow molds between the parison receiving position and an article take-out position. The first blow mold is caused to receive a first length of parison from the extruder while the first blow mold is in the parison receiving position. The drive is then actuated to move the first blow mold out of the parison receiving position in a first radial direction and to move the first blow mold to the article take-out position. The first blow mold is then caused to release a blown article formed from the first length of parison. The drive is actuated to move the second blow mold to the parison receiving position in a third radial direction angularly spaced from the first radial direction after the first blow mold has moved out of the parison receiving position. The second blow mold is then caused to receive a second length of parison from the extruder. The drive then actuated to move the second blow mold out of the parison receiving position in a second radial direction angularly spaced from the first and third radial directions and to move the second blow mold to the article take-out position. The second blow mold is then caused to release a blown article formed from the second length of parison. The drive is actuated to move the first blow mold back into the parison receiving position from the third radial direction after the second blow mold has moved out of the parison receiving position.

BRIEF DESCRIPTION OF THE DRAWINGS

These and other features and advantages of the invention will become apparent to those skilled in the art in connection with the following detailed description and drawings, in which.

DETAILED DESCRIPTION

Figure 8:
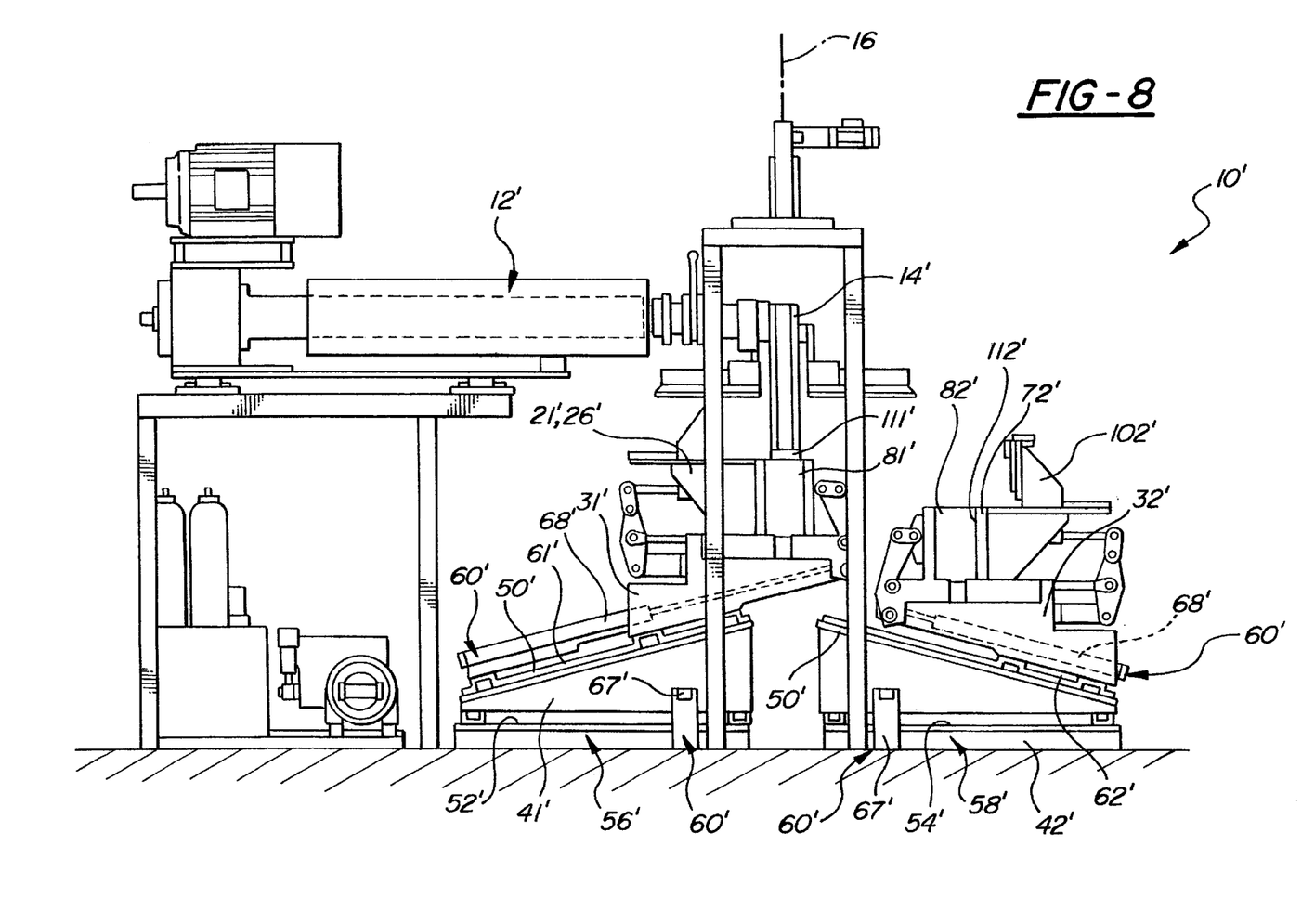
FIG. 8 is a partial cross-sectional front view of an alternative embodiment of a blow molding apparatus constructed according to the invention.
Figure 9:
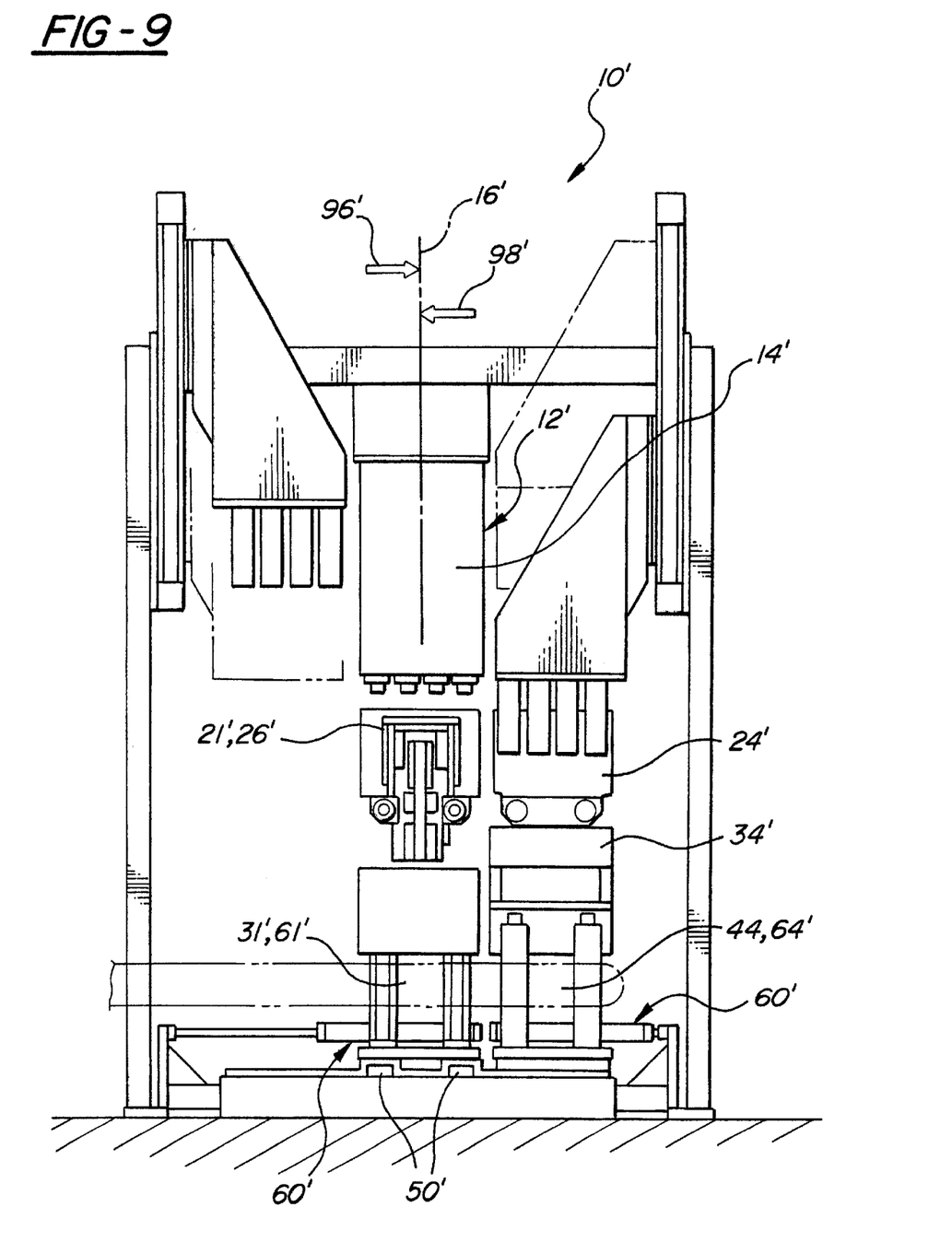
FIG. 9 is an end view of the blow molding apparatus of FIG. 8 showing mold labeling and article take-out mechanisms configured according to the invention.

A blow molding apparatus for blow molding hollow articles such as plastic bottles is shown at 10 in FIGS. 1–5 of the attached drawing sheets. An alternative blow molding apparatus is shown at 10' in FIGS. 8 and 9. Reference numerals with the designation prime (') in FIGS. 8 and 9 indicate alternative configurations of elements that also appear in the first embodiment. Unless indicated otherwise, where a portion of the following description uses a reference numeral to refer to the figures, that portion of the description applies equally to elements designated by primed numerals in FIGS. 8 and 9.

Figure 6:
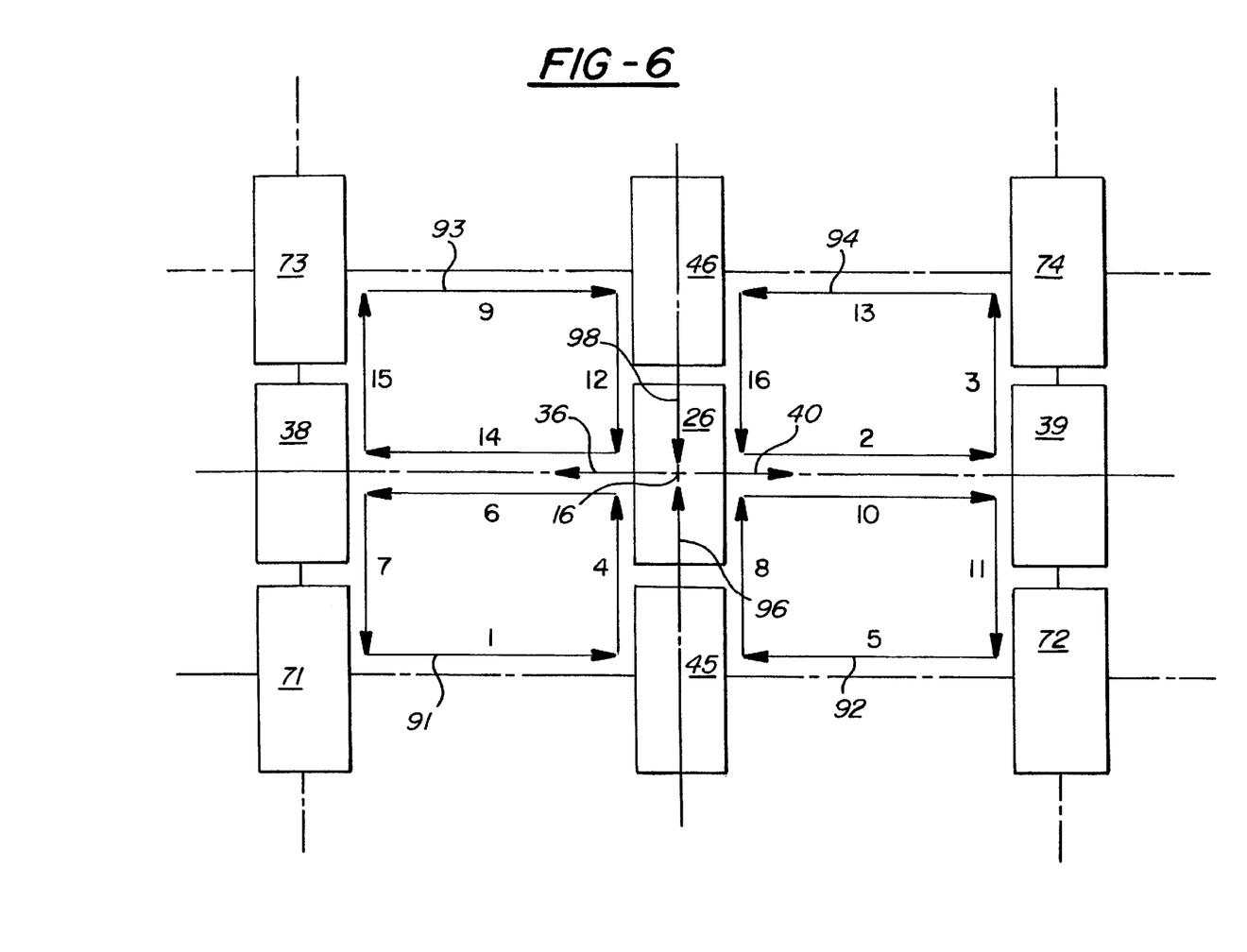
FIG. 6 is a schematic plan view of cyclical movement patterns of the trolley and shuttle-mounted blow molds of the blow molding apparatus of FIG. 1.

The apparatus 10 includes a parison extruder 12 that continuously extrudes a tubular parison vertically downward through a parson extruder head 14 along a generally vertical extrusion axis 16. First, second, third and fourth blow molds 21, 22, 23, 24 are supported on individual trolleys 31, 32, 33, 34 for translational movement into a parison receiving position 26 aligned with the extrusion axis 16 and for movement out of the parison receiving position 26. The first and third blow molds 21, 23 are supported for movement out of the parison receiving position 26 in a first radial direction 36 to a first outer position 38 spaced from the extrusion axis 16. The first radial direction 36 and the first outer position 38 are best shown in FIG. 6. The second and fourth blow molds 22, 24 are supported for movement out of the parison receiving position 26 in a second radial direction 40 opposite the first radial direction 36 into a second outer position 39 spaced from the extrusion axis 16. Again, the second radial direction 40 and second outer position 39 are best shown in FIG. 6.

Figure 5:
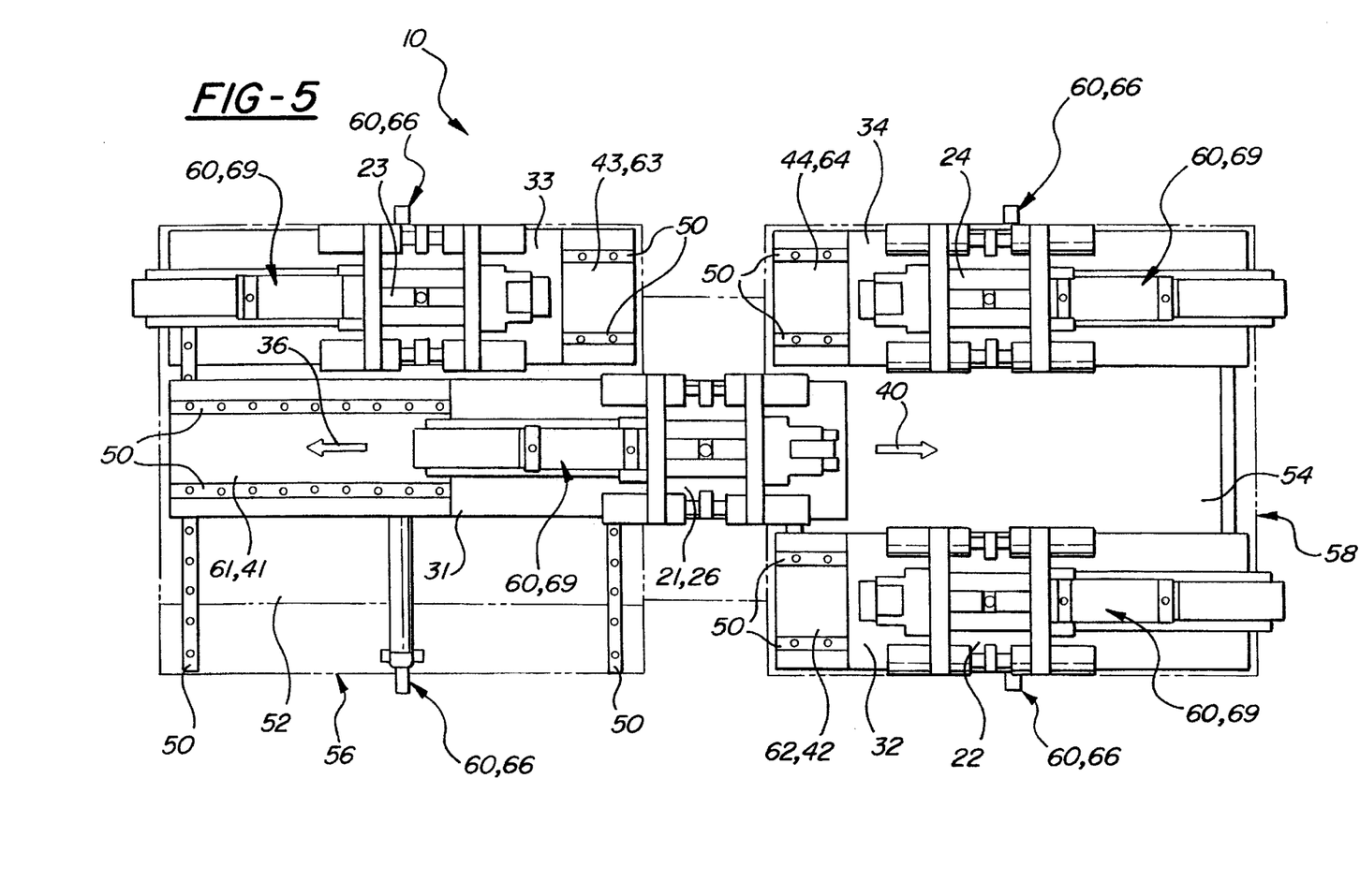
FIG. 5 is a plan view of the trolleys, shuttles and shuttle bases of FIG. 3 with the molds and blow pin assemblies removed for clarity and with mold cavities of the molds shown in phantom.

Each blow mold is supported on its respective trolley 31, 32, 33, 34 for motion generally parallel to the first and second radial directions 36, 40. Therefore, the trolleys 31, 32, 33, 34 support the molds 21, 22, 23, 24 for motion between the parison receiving position 26 beneath the parison extruder head 14 and the respective first and second outer positions 38, 39 as best shown in FIGS. 5 and 6. Each trolley 31, 32, 33, 34 also supports its respective blow mold 21, 22, 23, 24 for movement into either a first 45 or a second 46 article take-out position best shown in FIG. 6.

The trolleys 31, 32, 33, 34 supporting the blow molds 21, 22, 23, 24 are supported on respective shuttles 41, 42, 43, 44 for lateral motion generally perpendicular to the first and second directions 36, 40. As shown in FIGS. 1–5, the first and third shuttles 41, 43 are movably supported for translational motion on tracks 50 mounted to an upper surface 52 of a first shuttle base 56. As is also shown in FIGS. 1–5, the second and fourth shuttles 42, 44 are supported for translational motion on tracks 50 mounted on an upper surface 54 of a second shuttle base 58.

A drive, shown at 60 in FIGS. 1–5, is operatively connected to the trolleys 31, 32, 33, 34, shuttles 41, 42, 43, 44 and molds 21, 22, 23, 24 and is configured to alternately cycle the molds 21, 22, 23, 24 through the parison receiving position 26 by moving the trolleys 31, 32, 33, 34 and the shuttles 41, 42, 43, 44 supporting the trolleys 31, 32, 33, 34. The drive 60 is also configured to alternately open and close the molds 21, 22, 23, 24.

Figure 1:
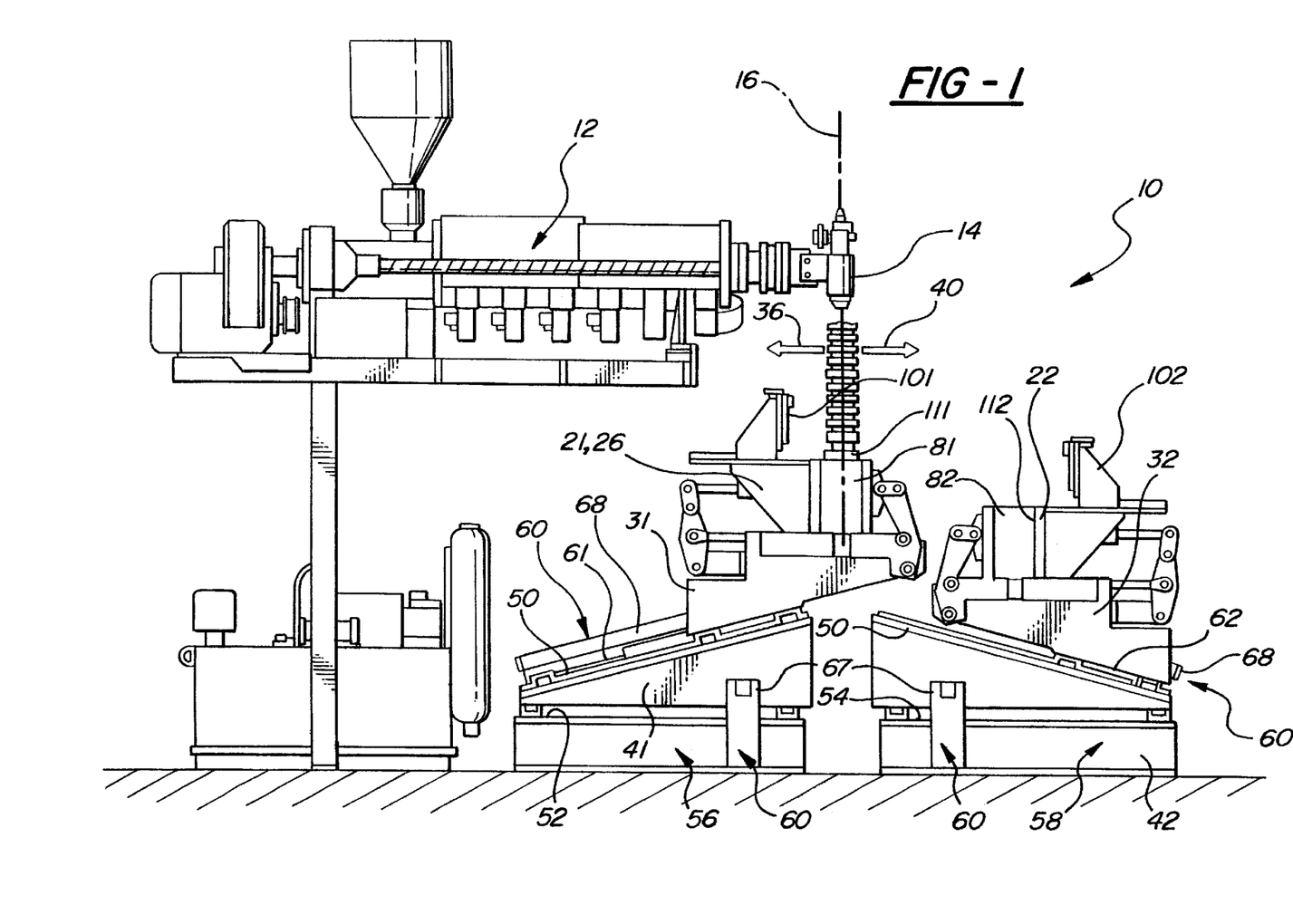
FIG. 1 is a partial cross-sectional front view of a blow molding apparatus constructed according to the invention.
Figure 2:
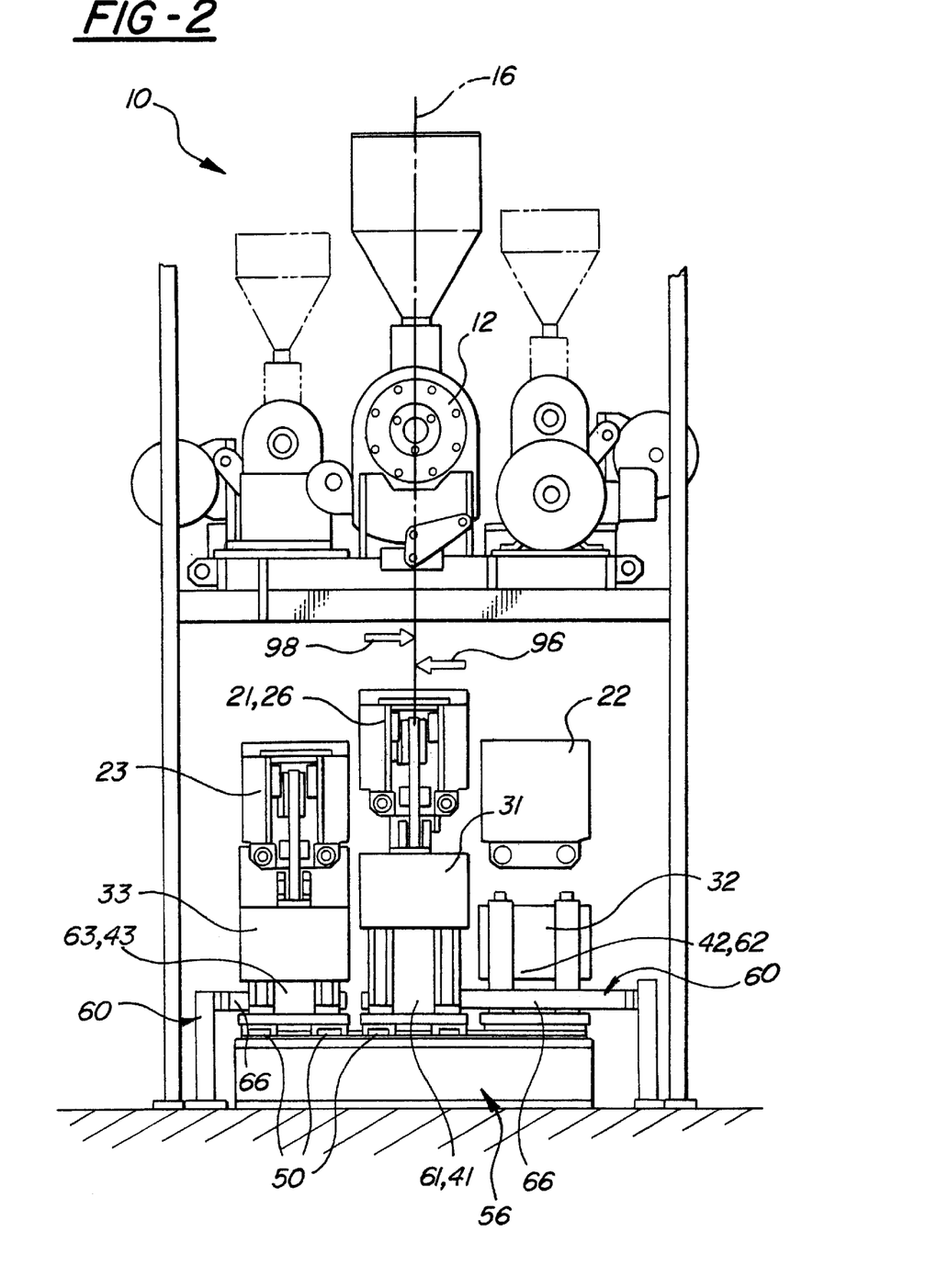
FIG. 2 is a side view of the blow molding apparatus of FIG. 1.
Figure 3:
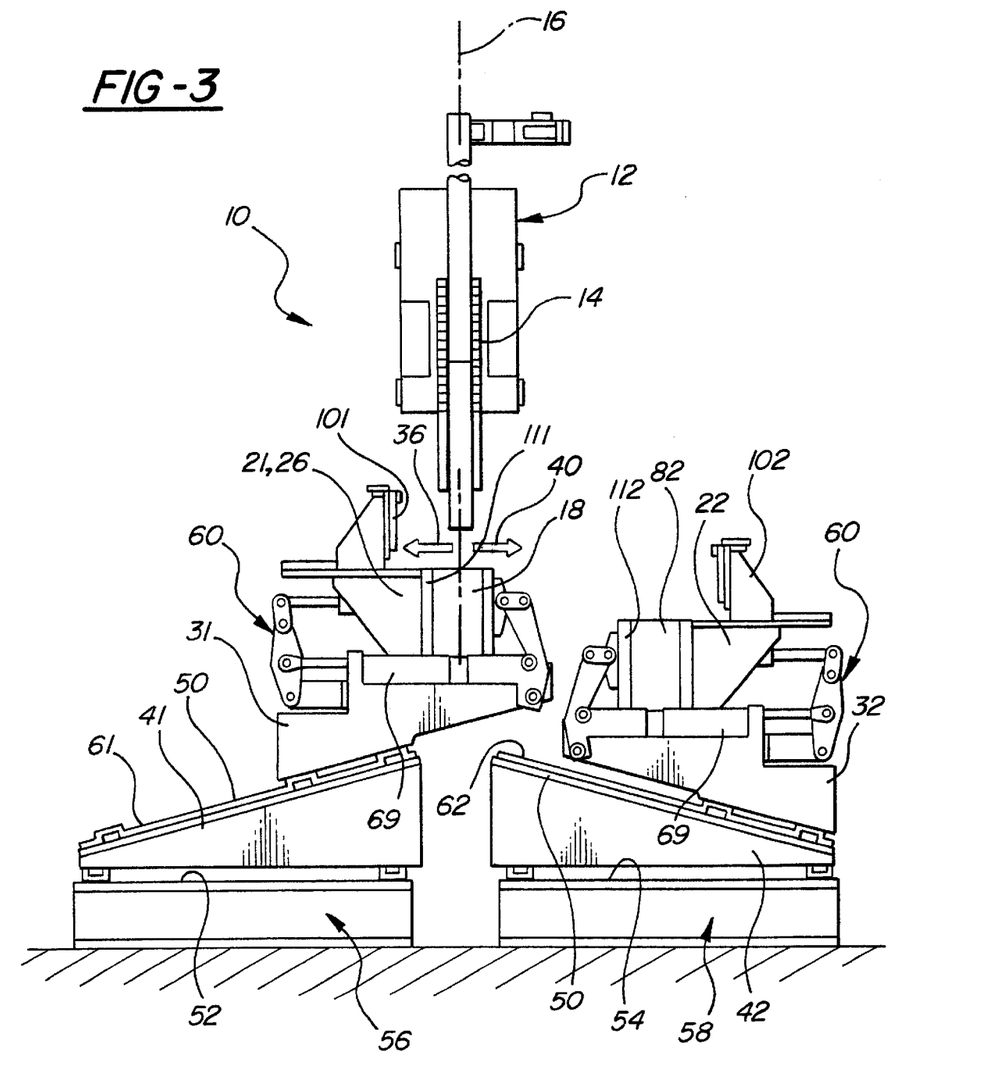
FIG. 3 is a magnified partial cross-sectional view of an extruder head, blow molds, blow pin assemblies, clamps, trolleys, shuttles and shuttle bases of the blow molding apparatus of FIG. 1.

As shown in FIGS. 1 and 2, the drive 60 includes four hydraulic cylinder shuttle cross-slides 66 that are connected between the respective shuttles 41, 42, 43, 44 and respective cross-slide brackets 67. The hydraulic cylinder shuttle cross-slides 66 drive the respective shuttles 41, 42, 43, 44 reciprocally in directions generally perpendicular to the first and second directions 36, 40. The drive 60 also includes four hydraulic trolley cylinders 68, one of which is connected between each trolley 31, 32, 33, 34 and the shuttle 41, 42, 43, 44 it is mounted on. The four hydraulic trolley cylinders 68 drive the respective trolleys 31, 32, 33, 34 up and down respective ramped surfaces 61, 62, 63, 64 of the shuttles 41, 42, 43, 44, reciprocally, in the first and second directions 36, 40. As best shown in FIG. 5, the drive also includes four hydraulic mold cylinders 69 that are operatively connected to the respective molds 21, 22, 23, 24. The mold cylinders 69 drive the molds 21, 22, 23, 24 between their open and closed positions. Proportional control valves 70 control the flow of hydraulic fluid to the cylinders 66, 67, 68, 69 from a hydraulic fluid source. In other embodiments, the drive 60 may include linear actuator systems of any suitable type known in the art.

The ramped surfaces 61, 62, 63, 64 that support the respective trolleys 31, 32, 33, 34 are oriented to allow the trolleys 31, 32, 33, 34 to move up and down the respective ramped surface 61, 62, 63, 64. Each ramped surface 61, 62, 63, 64 is also oriented such that the trolleys 31, 32, 33, 34 are elevated relative to the first and second outer positions 38, 39 when in the parison receiving position 26. The trolleys 31, 32, 33, 34 are also elevated relative to the first and second outer positions 38, 39 when they are in either of the two article take-out positions 45, 46. As each trolley 31, 32, 33, 34 carries a mold 21, 22, 23, 24 from the parison receiving position 26 to one of the first and second outer positions 38, 39 each trolley 31, 32, 33, 34 and mold 21, 22, 23, 24 move down the ramped surface 61, 62, 63, 64 they are supported on. As each trolley 31, 32, 33, 34 carries a mold 21, 22, 23, 24 from one of four corner positions 71, 72, 73, 74 to one of the two article take-out positions 45, 46, the trolley 31, 32, 33, 34 and mold 21, 22, 23, 24 move up the ramped surface 61, 62, 63, 64 they are supported on. The four corner positions are best shown in FIG. 6.

Each blow mold 21, 22, 23, 24 is configured to receive a length of parison extending from the parison extruder 12 when in the parison receiving position 26, to enclose and sever the length of parison, to contain and shape the parison during blow molding and to release the blown article in one of the two article take-out positions 45, 46. Each blow mold 21, 22, 23, 24 includes a blow mold cavity 81, 82, 83, 84 shaped to complement a desired exterior shape of a hollow article to be formed in the mold. Each blow mold 21, 22, 23, 24 comprises two mold halves that are openable to receive a length of parison from the parison extruder 12 and closeable to sever and enclose the length of parison for blow molding. (While they are referred to herein as "halves" for convenience, these two halves of each mold need not constitute half of their respective molds either in size or weight. One "half" may be considerably larger or heavier than its corresponding mate.) The halves of each blow mold 21, 22, 23, 24 are also openable to allow one of two article take-out mechanisms 86, 88 to extract a blown article from each mold after hardening in one of the article take-out positions 45, 46 and to allow one of two in-mold labeler assemblies 89, 90 to insert a label.

As is best shown in FIGS. 5 and 6, the first and second blow molds 21, 22 are supported on their respective trolleys 31, 32 for movement along respective first and second closed rectilinear paths best shown at 91, 92 in FIG. 6. The first and second closed rectilinear paths 91, 92 return the first and second blow molds 21, 22 to the parison receiving position 26 in a third radial direction 96 perpendicular to the first and second radial directions 36, 40. The third and fourth blow molds 23, 24 are similarly supported on their respective trolleys for movement along respective third and fourth closed rectilinear paths best shown at 33 and 34 in FIG. 6. The third and fourth closed rectilinear paths 33, 34 return the third and fourth blow molds 23, 24 to the parison receiving position 26 from a fourth radial direction 98 perpendicular to the first and second radial directions 36, 40 and diametrically opposite the third radial direction 96 relative to the extrusion axis 16.

Figure 7:
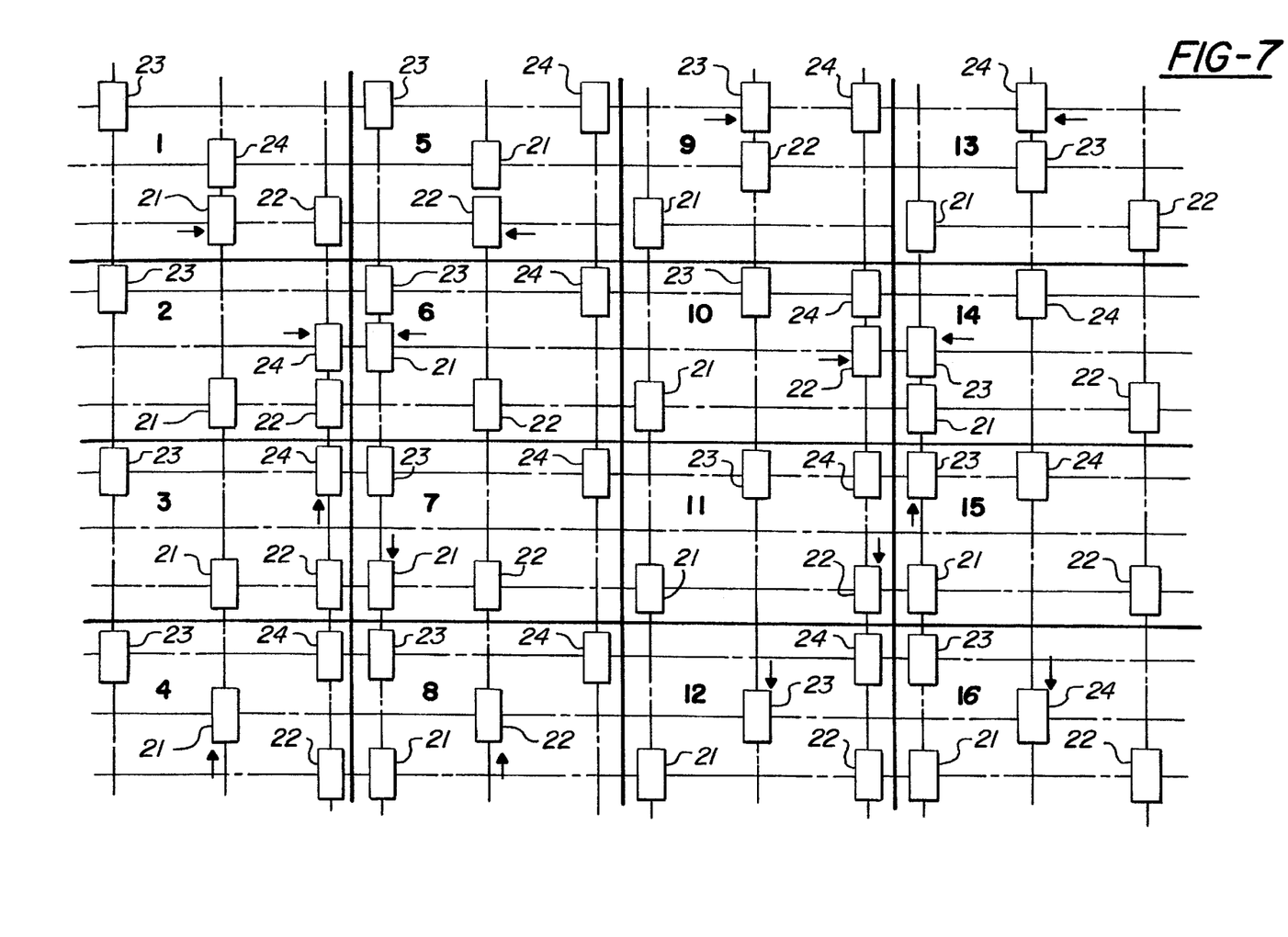
FIG. 7 is a series of schematic views showing the sequence of movements of the trolley and shuttle-mounted molds of the blow molding apparatus of FIG. 1.

As is best shown in FIGS. 6 and 7, the drive 60 alternately moves each of the blow molds 21, 22, 23, 24 into the parison receiving position 26 as it moves each blow mold 21, 22, 23, 24 around its respective rectilinear path 91, 92, 93, 94. The drive 60 moves the first and third blow molds 21, 23 from the parison receiving position 26 into the first outer position 38, from the first outer position 38 to the respective first and third corner positions 71, 73, from the first and third corner positions 71, 73 to the respective first and second article take-out positions 45, 46, and back to the parison receiving position 26. The drive 60 also moves the second and fourth blow molds 22, 24 from the parison receiving position 26 to the second outer position 39, from the second outer position 39 to the respective second and fourth corner positions 72, 74, from the second and fourth corner positions 72, 74 to the respective first and second article take-out positions 45, 46 and back to the parison receiving position 26.

Referring, again, to FIGS. 5 and 6, the first and second blow molds 21, 22 are supported for movement from the first and second outer positions 38, 39, respectively, into a first 45 of the two article take-out positions 45, 46 that is spaced from the parison receiving position 26 in the fourth radial direction 98. The third and fourth blow molds 23, 24 are supported for movement from the first and second outer positions 38, 39, respectively, into a second 46 of the two article takeout positions 45, 46 that is spaced from the parison receiving position 26 in the third radial direction 96. The first and second article take-out mechanisms 86, 88 are supported adjacent the respective first and second article take-out positions 45, 46. The first article take-out mechanism 86 is -configured to remove blown articles from the first and second blow molds 21, 22 when the first and second blow molds 21, 22 are open and disposed at the first article take-out position 45. The second article take-out mechanism 88 is configured to remove blown articles from the third and fourth blow molds. 23, 24 when the third and fourth blow molds 23, 24 are open and disposed at the second article take-out position 46.

Figure 4:
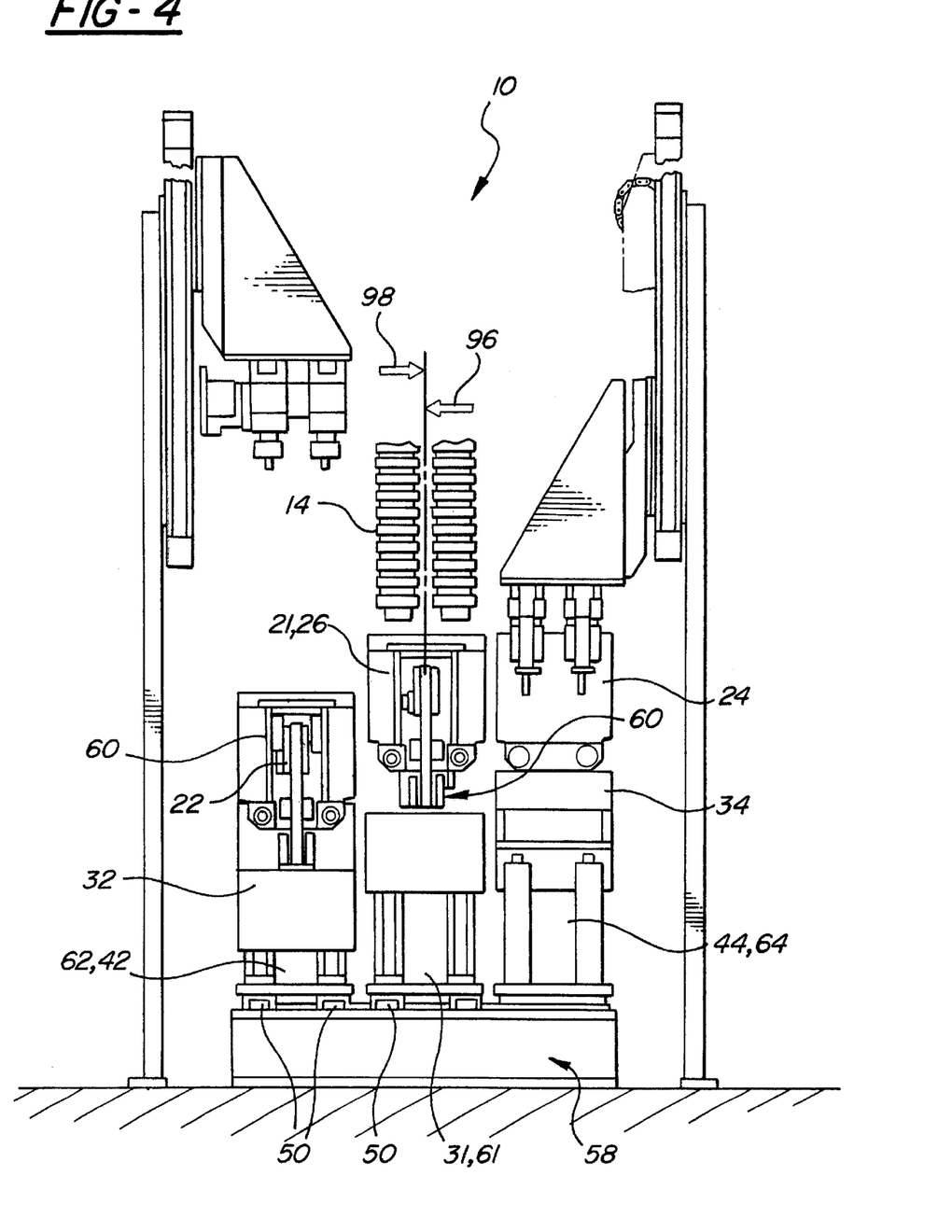
FIG. 4 is an end view of the blow molding apparatus of FIG. 1 showing mold labeling and article take-out mechanisms configured according to the invention.

As shown in FIG. 4, first and second in-mold labeler assemblies 89, 90 may be incorporated into the blow molding apparatus 10 and supported adjacent the respective first and second article take-out positions 45, 46. The first in-mold labeler assembly 89 is configured to place labels within the first and second blow molds 21, 22 when the first and second blow molds 21, 22 are open and disposed at the first article take-out position 45 and after the first article take-out mechanism 86 has extracted a blown article. The second in-mold labeler assembly 90 is configured to place labels within the third and fourth blow molds 23, 24 when the third and fourth blow molds 23, 24 are open and disposed at the second article take-out position 46 and after the second article take-out mechanism 88 has extracted a blown article. The in-mold labeler assemblies 89, 90 position labels within the molds 21, 22, 23, 24 so that when a length of parison is blown into contact with inner walls of the mold cavities 81, 82, 83, 84 of the molds 21, 22, 23, 24 the labels will adhere to the blown article as is known in the art.

A blow pin 101, 102, 103, 104 is supported on each trolley 31, 32, 33, 34 adjacent respective ones of the blow molds 21, 22, 23, 24. Each blow pin 101, 102, 103, 104 is movable into a position aligned with an upper blow pin opening 111, 112, 113, 114 in an associated mold cavity 81, 82, 83, 84 supported on the same trolley 31, 32, 33, 34. Each blow pin 101, 102, 103, 104 is also supported for insertion into its associated mold cavity 81, 82, 83, 84 through the upper blow pin opening 111, 112, 113, 114 of that mold cavity. Each blow pin 101, 102, 103, 104 is configured to inject gas into a length of parison enclosed within its associated mold cavity 81, 82, 83, 84 to expand the parison against inner walls of the mold cavity 81, 82, 83, 84 to form a hollow article to a desired shape as is well known in the art. One suitable blow pin assembly design is shown in U.S. Pat. No. 5,971,741 issued Oct. 26, 1999 to Weber, assigned to the assignee of the present invention and incorporated herein by reference.

In practice, and as shown in FIG. 7, hollow articles such as plastic bottles may be rapidly produced using the apparatus 10 described above by first moving the first mold 21 from a first corner position 71 into the first article take-out position 45 as shown in Frame 1 of FIG. 7. The fourth mold 24 is then closed to sever and capture a length of parison and is moved from the parison receiving position 26 to the second outer position 39 as shown in Frame 2. Gas is then injected into the length of parison disposed within the fourth mold 24. The first mold 21 is then opened and any blown article is removed from the first mold 21 as shown in Frame 3. The first mold 21 is then moved from the first article take-out position 45 to the parison receiving position 26 as shown in Frame 4.

The second mold 22 is then moved from a second corner position 72 into the first article take-out position 45 as shown in Frame 5 of FIG. 7. The first mold 21 is closed to sever and capture a length of parison and is moved from the parison receiving position 26 to the first outer position 38 as shown in Frame 6. Gas is injected into the length of parison disposed within the first mold 21 and the first mold 21 is moved from the first outer position 38 to the first corner position 71 as shown in Frame 7. The second mold 22 is then opened and any blown article present in the second mold 22 is removed. The second mold 22 is then moved from the first article take-out position 45 to the parison receiving position 26 as shown in Frame 8.

The third mold 23 is then moved from a third corner position 73 into the second article take-out position 46 as shown in Frame 9 of FIG. 7. The second mold 22 is closed to sever and capture a length of parison and is moved from the parison receiving position 26 to the second outer position 39 as shown in Frame 10. Gas is injected into the length of parison disposed within the second mold 22 and the second mold is moved from the second outer position 39 to the second corner position 72 as shown in Frame 11. The third mold 23 is then opened and any blown article present within is removed from the third mold 23. The third mold 23 is then moved from the second article take-out position 46 to the parison receiving position 26 as shown in Frame 12.

The fourth mold 24 is then moved from a fourth corner position 74 into the second article take-out position 46 as shown in Frame 13 of FIG. 7. The third mold 23 is closed and moved from the parison receiving position 26 to the first outer position 38 shown in Frame 14. Gas is injected into the length of parison disposed within the third mold 23 and the third mold is moved from the first outer position 38 to the third corner position 73 as shown in Frame 15. The fourth mold 24 is then opened and a blown article formed from the parison is removed from the fourth mold 24, and the fourth mold 24 is moved from the second article take-out position 46 to the parison receiving position 26 as shown in Frame 16.

While the process steps shown in FIG. 7 and described above are shown serially for clarity, it is desirable that two or more of each group of four process steps, i.e., the process steps shown in Frames 1–4, 5–8, 9–12 and 13–16, respectively, be executed concurrently rather than serially in actual practice. Concurrent execution of these steps will obviously reduce cycle time and increase production rate.

The in-mold labeler assemblies 89, 90 place labels within the blow molds 21, 22, 23, 24 before each blow mold is moved from the first or second article take-out positions 45, 46 to the parison receiving position 26. In other embodiments the in-mold labeler assemblies 89, 90 may be adapted from any suitable in-mold labeler known in the art.

Moving the molds 21, 22, 23, 24 into the parison receiving position 26 from directions different from those used to move the molds 21, 22, 23, 24 out of the parison receiving position 26 in respective cyclical patterns allows more than two blow molds to be serviced by a single extruder head 14. As a result, the proportion of each mold cycle used for cooling the parison is increased and a greater output can be achieved for each extruder head 14. Therefore, a blow molding apparatus 10 constructed according to the invention is better able to dedicate a higher percentage of total cycle time to cooling the parison without reducing the number of blown articles produced by the apparatus over a given period of time.

This description is intended to illustrate certain embodiments of the invention rather than to limit the invention. Therefore descriptive rather than limiting words are used. Obviously, it is possible to modify this invention from what the description teaches. In other words, one may practice the invention other than as described.

What is claimed is:

1. A blow molding apparatus (10) for blow molding hollow articles, the apparatus (10) comprising:

a parison extruder (12) configured to extrude a tubular parison along an extrusion axis (16);

first and second blow molds (21, 22) supported for movement into a parison receiving position (26) aligned with the extrusion axis (16) and for movement out of the parison receiving position (26) in respective first and second radial directions (36, 40), each blow mold being configured to receive a length of parison extending from the parison extruder (12) when in the parison receiving position (26), to enclose and sever the length of parison, to contain and shape the parison during blow molding and to release the blown article in an article take-out position (45, 46);

a drive (60) configured to alternately move the first and second blow molds (21, 22) into the parison receiving position (26), from the parison receiving position (26) in the respective first and second radial directions (36, 40) and back to the parison receiving position (26);

at least one of the first and second blow molds (21, 22) being supported for movement into the parison receiving position (26) from a third radial direction (96) angularly spaced between the first and second radial directions (36, 40).

2. A blow molding apparatus (10) as defined in claim 1 in which:

a third blow mold (23) is supported for movement out of the parison receiving position (26) in one of the first and second radial directions (36, 40) and is supported for movement into the parison receiving position (26) from a fourth radial direction (98) that is angularly spaced between the first and second radial directions (36, 40) and is generally opposite the third radial direction (96); and the drive (60) is configured to alternately move each of the blow molds (21, 22, 23) into the parison receiving position (26) in respective cyclical patterns, move the third blow mold (23) out of the parison receiving position (26) in one of the first and second radial directions (36, 40), and move the third blow mold (23) back to the parison receiving position (26) from the fourth radial direction (98).

3. A blow molding apparatus (10) as defined in claim 2 in which:

the third blow mold (23) is supported for movement out of the parison receiving position (26) in the first radial direction (36); and a fourth blow mold (24) is supported for movement out of the parison receiving position (26) in the second radial direction (40);

the fourth blow mold (24) is supported for movement into the parison receiving position (26) from the fourth radial direction (98); and the drive (60) is configured to move the fourth blow mold (24) out of the parison receiving position (26) and back to the parison receiving position (26).

4. A blow molding apparatus (10) as defined in claim 1 in which:

the first and second blow molds (21, 22) are supported for movement into an article take-out position (45); and an article take-out mechanism (86) is supported adjacent the article take-out position (45), the article take-out mechanism (86) being configured to remove blown articles from the first and second blow molds (21, 22) when the first and second blow molds are open and disposed at the article take-out position (45).

5. A blow molding apparatus (10) as defined in claim 4 in which an in-mold labeler assembly (89) is supported adjacent the article take-out position (45), the in-mold labeler assembly being configured to place labels within the first and second blow molds (21, 22) when the first and second blow molds are open and disposed at the article take-out position (45) and after the article take-out mechanism (86) has extracted a blown article.

6. A blow molding apparatus (10) as defined in claim 4 in which:

each blow mold (21, 22) is supported on a respective trolley (31, 32) for motion generally parallel to the first and second radial directions (36, 40) and perpendicular to the third radial direction (96); and the drive (60) is configured to move the molds (21, 22) from the parison receiving position (26) to the article take-out position (45, 46) by moving the trolleys (31, 32) supporting the molds (21, 22).

7. A blow molding apparatus (10) as defined in claim 6 in which:

each trolley (31, 32) is supported on a respective shuttle (41, 42) for lateral motion generally perpendicular to the first and second directions and parallel to the third radial direction (96); and the drive (60) is configured to alternately move the molds into the parison receiving position (26) from the article take-out position (45) by moving the shuttles supporting the trolleys (31, 32) and molds (21, 22).

8. A blow molding apparatus (10) as defined in claim 7 in which:

each shuttle (41, 42) includes a ramped surface (61, 62);

each trolley (31, 32) is movably supported on a corresponding one of the ramped surfaces (61, 62) of the shuttles (41, 42);

each ramped surface is configured to support a trolley (31, 32) for motion up and down the ramped surface; and each ramped surface is also configured to elevate a trolley (31, 32) in the parison receiving position (26) and in the article take-out position (45, 46).

9. A blow molding apparatus (10) as defined in claim 6 and further including blow pins (101, 102) supported on the first and second trolleys (31, 32) respectively, and adjacent the first and second blow molds (21, 22) respectively, each blow pin (101, 102) being:

movable into a position aligned with a blow pin opening (111, 112) in an associated mold cavity (81, 82) supported on the same trolley (31, 32);

supported for insertion into its associated mold cavity (81, 82) through the blow pin opening (111, 112) of that mold cavity (81, 82); and configured to inject gas into a length of parison enclosed within its associated mold cavity (81, 82) to expand the parison against inner walls of the mold cavity (81, 82).

10. A method for blow molding hollow articles, the method including the steps of:

providing a blow molding apparatus (10) including a parison extruder (12) and first and second blow molds (21, 22), each blow mold being configured to contain and shape lengths of parison during blow molding and to release resulting blown articles in an article take-out position (45), and a drive (60) configured to alternately move the first and second blow molds (21, 22) between the parison receiving position (26) and the article take-out position (45);

causing the first blow mold (21) to receive a first length of parison from the extruder (12) while the first blow mold (21) is in the parison receiving position (26);

actuating the drive (60) to move the first blow mold (21) out of the parison receiving position (26) in a first radial direction (36);

actuating the drive (60) to move the first blow mold (21) to the article take-out position (45, 46);

causing the first blow mold (21) to release a blown article formed from the first length of parison;

actuating the drive (60) to move the second blow mold (22) to the parison receiving position (26) in a third radial direction (96) angularly spaced from the first radial direction (36) after the first blow mold (21) has moved out of the parison receiving position (26);

causing the second blow mold (22) to receive a second length of parison from the extruder (12);

actuating the drive (60) to move the second blow mold (22) out of the parison receiving position (26) in a second radial direction (40) angularly spaced from the first and third radial directions (36, 96);

actuating the drive (60) to move the second blow mold (22) to the article take-out position (45);

causing the second blow mold (22) to release a blown article formed from the second length of parison;

actuating the drive (60) to move the first blow mold (21) back into the parison receiving position (26) after the second blow mold (22) has moved out of the parison receiving position (26).

11. The method of claim 10 including the step of placing a label in each mold (21, 22) before moving each mold to the parison receiving position (26).

12. The method of claim 10 in which the second blow mold (22) is moved to the first article take-out position (45, 46) at generally the same time that the first blow mold (21) is moved from the parison receiving position (26).

13. The method of claim 10 in which:

the step of providing a blow molding apparatus (10) includes providing such an apparatus (10) that includes additional third and fourth blow molds (23, 24), each configured to contain and shape lengths of parison during blow molding and to release resulting blown articles when in a second article take-out position (46), the drive (60) being configured to alternately move the third and fourth blow molds (23, 24) between the parison receiving position (26) and the second article take-out position (45, 46); and including the additional steps of:

actuating the drive (60) to move the third blow mold (23) to the parison receiving position (26) in a fourth radial direction (98) angularly spaced between the first and second radial directions (36, 40) and generally opposite the third radial direction (96) after the second blow mold (22) moves out of the parison receiving position (26);

causing the third blow mold (23) to receive a third length of parison from the extruder (12);

actuating the drive (60) to move the third blow mold (23) out of the parison receiving position (26) in the first radial direction (36);

actuating the drive (60) to move the third blow mold (23) to the second article take-out position (46);

causing the third blow mold (23) to release a blown article formed from the third length of parison;

actuating the drive (60) to move the fourth blow mold (24) to the parison receiving position (26) in the fourth radial direction (98) after the third blow mold (23) moves out of the parison receiving position (26);

causing the fourth blow mold (24) to receive a fourth length of parison from the extruder (12);

actuating the drive (60) to move the fourth blow mold (24) out of the parison receiving position (26) in the second radial direction (40);

actuating the drive (60) to move the fourth blow mold (24) to the second article take-out position (46);

causing the fourth blow mold (24) to release a blown article formed from the fourth length of parison;

actuating the drive (60) to move the first blow mold (21) back into the parison receiving position (26) from the third radial direction (96) after the fourth blow mold (24) has moved out of the parison receiving position (26).

14. The method of claim 13 including the step of placing a label within each mold (21, 22, 23, 24) before moving each mold to the parison receiving position (26).

15. The method of claim 13 in which the first blow mold (21) moves to the first article take-out position (45) at generally the same time that the fourth blow mold (24) moves out of the parison receiving position (26).

16. The method of claim 13 in which the second mold (22) moves to the first article take-out position (45) at generally the same time that the first mold moves out of the parison receiving position (26).

17. The method of claim 13 in which the third blow mold (23) is moved to the second article take-out position (46) at generally the same time that the second blow mold (22) is moved from the parison receiving position (26).

18. The method of claim 13 in which the fourth blow mold (24) is moved to the second article take-out position (46) at generally the same time as the third blow mold (23) is moved from the parison receiving position (26).

\* \* \* \* \*